United States Patent [19]

Komatsu

[11] Patent Number: 4,810,203
[45] Date of Patent: Mar. 7, 1989

[54] ELECTRICAL CONNECTOR

[75] Inventor: Yasuhiro Komatsu, Osaka, Japan

[73] Assignee: Hosiden Electronics Co., Ltd., Osaka, Japan

[21] Appl. No.: 135,233

[22] Filed: Dec. 21, 1987

[30] Foreign Application Priority Data

Dec. 27, 1986 [JP] Japan .................. 61-204018[U]

[51] Int. Cl.$^4$ .................. H01R 13/62; H01R 9/07
[52] U.S. Cl. .................. 439/326; 439/260; 439/267; 439/377
[58] Field of Search .............. 439/259, 260, 265, 267, 439/325, 326, 329, 332, 333, 377

[56] References Cited

U.S. PATENT DOCUMENTS

| | | | |
|---|---|---|---|
| 3,920,303 | 11/1975 | Pittman et al. | 339/91 R |
| 4,185,882 | 1/1980 | Johnson | 339/176 MP |
| 4,261,631 | 4/1981 | Guilcher et al. | 339/75 MP |
| 4,553,803 | 11/1985 | Lapraik et al. | 339/74 R |
| 4,613,193 | 9/1986 | Beers | 339/17 L |
| 4,629,270 | 12/1986 | Andrews, Jr. et al. | 339/75 MP |
| 4,636,022 | 1/1987 | Sonobe | 339/75 MP |
| 4,678,252 | 7/1987 | Moore | 439/62 |

Primary Examiner—William L. Sikes
Assistant Examiner—Akm E. Ullah
Attorney, Agent, or Firm—Jones, Tullar & Cooper

[57] ABSTRACT

In the disclosed electrical connector, the card inserted from the inlet is moved, together with the slider abutting against this card, in a state being inclined to the specified placing plane, resisting the thrusting force to the inlet side by the thrusting means, and when this card and slider reach the specified position, the card and slider are oscillated about the oscillating fulcrum part to position them on the specified placing plane, thereby causing the contact formed on the contact piece part of the conductor piece to contact elastically with the contact of the card, while fixed the slider on the specified placing plane by the lock mechanism.

17 Claims, 7 Drawing Sheets

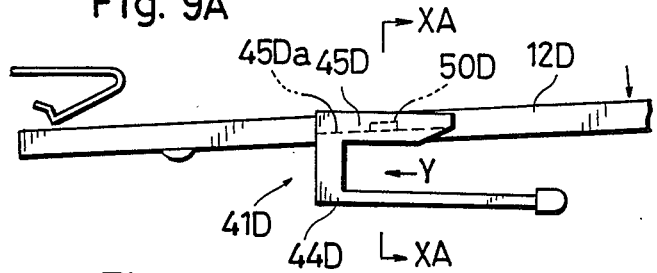
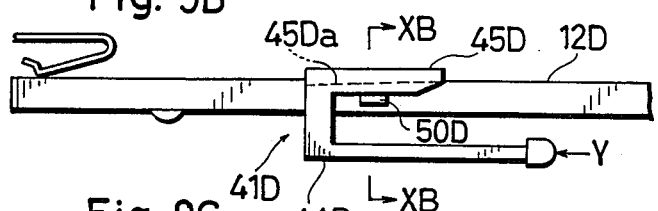
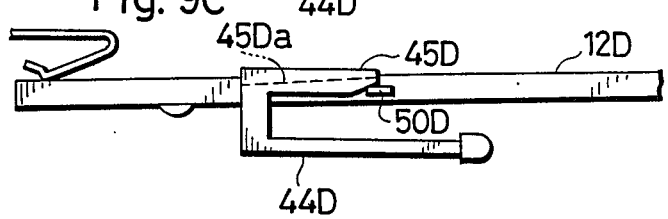
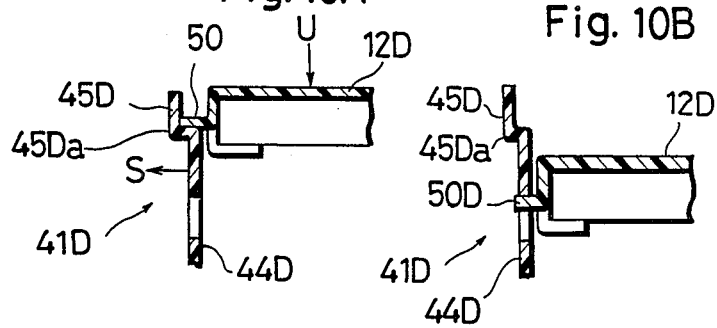

ELECTRICAL CONNECTOR

BACKGROUND OF THE INVENTION

1. Field of the Invention

This invention relates to an electrical connector used for electrically connecting a circuit substrate such as IC card storing key words, computer program or the like, to the equipment main body mounting a computer.

An IC card is a package structure leading out the contacts provided on one side of a circuit substrate mounting an integrated circuit to the outside, and by inserting this IC card into the connector, the circuit substrate of the IC card is electrically connected to the main printed wiring substrate. The electrical connector having such action is generally known as the one corresponding to the ROM card used in the conventional television game machine or the like, but recently, as the credit card or the like, the IC card having the contacts to contact with the equipment main body as mentioned above have been introduced, and the electrical connector comes to be used widely also for such IC card.

2. Description of the Prior Art

Conventional examples of thus used electrical connector are shown in FIG. 12 and FIG. 13.

The electrical connector shown in FIG. 12 is constituted as follows: as a ROM card 103 is inserted into a card inlet 102 provided in a body 101, a curved contact 106 formed in a contact piece part 105 of a conductor piece 104 built in said body 101 is pushed away outward as indicated by the arrow while rubbing against a ROM card 107, and when the ROM card 103 is inserted in the setting position, said contact 106 elastically abuts against the contact of the ROM card 103.

In the connector shown in FIG. 12, however, when it is attempted to conduct securely by firmly fitting the contact 106 of the conductor piece 104 against the contact of the ROM card 103, a large inserting force is needed to insert the ROM card 103, and the inserting operation becomes difficult, and also when inserting or drawing out the ROM card 103, the contact of the ROM card 103 and the contact 106 of the conductor piece 104 rub against each other firmly, so that the both or either contact may be abraded to deteriorate the performance. To the contrary, when it is attempted to restrict the deterioration of quality by reducing the contacting force of the contact piece part 105 of the conductor piece 104, the contact pressure between contacts becomes small, and failure in conduction is likely to occur. Accordingly, in the eletrical connector shown in FIG. 12, in order to minimize the deterioration of quality of contact and to maintain a satisfactory conduction, it is necessary not only to properly set the contacting force of said contact piece part 105, but also to use an expensive high performance spring material for the conductor piece 104 and increase the thickness of plating layer of the contact 106, which caused to raise the cost. Incidentally, since the ROM card 103 is pulled out of the connector when not in use, it is inserted and pulled but frequency, and the deterioration of quality of contact was actually significant in spite of the above measures.

In another conventional example of electrical connector shown in FIG. 13, when an extending member 207 disposed on a body 201 is rotated in one direction by a specified angle (for example, 90 degrees) and a conductor piece 204 held in said body 201 is pushed away outward, resisting the elasticity, the contact of the ROM card 203 does not rub agaisnt the contact 206 of the contact piece part 205 when the ROM card is inserted from the inlet 202, by inserting the ROM card 203 into the setting position and rotating said extending member 207 in the reverse direction as shown by a virtual line by a specified angle, the contact 206 is returned to the original position by the elasticity of the contact piece part 205 of said conductor piece 204, so that the contact 206 elastically contacts with the contact of the ROM card 203.

In this electrical connector shown in FIG. 13, when the contact piece part 205 of the conductor piece 204 is pushed away outward by the extending member 207, the contact does not rub against the contact 206 of the conductor piece 204 when inserting the ROM card 203, so that said deterioration of quality due to abrasion of the contact may be restricted if attempted to conduct securely by increasing the contacting force of the conductor piece 204. In this electrical connector, however, the extending member 207 and various parts for operating it are necessary, and the strcuture is complicated. Still more, strcuturally, since the preload state is the maximum spring displacement state, it is required to select a high power spring that is not exhausted easily or design the spring adequately. Furthermore, since the extending member 207 must be operated every time the ROM card 203 is inserted or pulled out, and its operation is very troublesome.

In the above examples of prior art, the contact for ROM card are shown, but similar contacts are used also for RAM card and other IC cards having contacts. And the same problems will occurs in other IC cards having such connectors and contacts, and the further secure quality assurance and simplification of opertion are needed in the IC cards used as credit cards or the like reduced to the size of a visiting card, in particular.

The present applicant already proposed a connector for printed circuit board capable of solving part of the above problems in the U.S. patent application No. 873,663, but, as stated above, as the electrical connector used in IC card or the like, securer quality assurance and simpler operation are required, and the connector proposed in said U.S. patent application No. 873,663 must be further improved.

SUMMARY OF THE INVENTION

In the light of the background described above, it is hence a primary object of this invention to present an electrical connector reduced in deterioration of quality due to abrasion of the contacts.

It is another object of this invention to present an elelctrical connector which is easy to be set a card on the placing plane or take out the card seated on the placing plane, that is, easy to handle.

These and other objects of this invention are realized by an electrical connector which comprises an inlet opened in the housing for inserting and removing a card having contacts, a slider which is engaged with the card inserted in this inlet and can be moved in a state inclined with respect to a specified placing plane by pressing the engaged card, thrusting means for thrusting this slider to said inlet side, an oscillation fulcrum part serving as the fulcrum for oscillating the sldier moved toward the inlet deeper side to a position on said specified placing plane, a lock mechanism for locking the slider positioned on said placing plane on this placing plane, and contacts formed at the cut section part of conductor piece possessing spring performance, and disposed at the positions elastically contacting with the contacts of the card engaged with the slider when the slider is positioned on the specified placing plane.

By using thus composed electrical connector, the card can be inserted or taken out in the state being inclined toward the placing plane, so that the contacts of the card may not touch the contacts of the contact piece part when inserting or removing. Therefore, wear of the contacts may be reduced or prevented, and faulty contact hardly occurs, so that the reliability is enhanced. In addition, unlike the conventional ZIF connector, it is not necessary to preload the connector side contact in the maximum displacement state, and expensive spring materials are not needed.

In another feature of the electrical connector of this invention, guide paths inclined toward the placing plane are disposed at both sides of the slider, guide protuberances to be inserted into said guide paths are formed in said slider, and key parts for inserting guide protuberances are consecutively disposed at the terminal end of said guide paths, whereby said slider is movable with respect to the placing plane by moving said guide protuberances along the guide paths, and the lock mechanism is designed to fix said slider on the placing plane by holding said guide protuberances at the lock position of said key parts by the thrusting means.

In this constitution, by the continuous operation of inserting the guide protuberances reaching the terminal end of guide paths into the kay parts consecutively formed at the terminal end of the guide paths, it is possible to fix the slider on the specified placing plane.

A further feature of the electrical connector of this invention is that the key part is formed in an L-shape bent toward starting end part side of said guide path, while the lock position to be engaged with said guide protuberance is disposed at its terminal end.

When thus composed, the guide protuberance will not get out of the key part by the reaction of the contact of the contact piece part elastically touching the contact of the card.

The electrical connector of this invention having the mechanism for releasing the slider fixed on the specified placing plane by the lock mechanism from this fixed position is furnished with a feedback groove consecutively disposed at the terminal end of the grooved key part through a protruding portion and joining with the grooved guide path at the front side from the terminal end of this key part, and said guide protuberance is disposed as the protuberance with variable projection thrust toward the projection side, whereby this guide protuberance is inserted into said feedback groove by way of said projecting part, reaches up to the starting end part of the guide path through this feedback groove by said thrusting means.

When thus composed, only by pushing in the slider, the guide protuberance can be moved into the feedback groove from the lock position at the key part, and when the guide protuberance is thus moved to the feedback groove, the guide protuberance is automatically moved to the starting end part of the guide path by the thrusting means. That is, by a single operation of pushing in the slider, this slider can be released from the fixed state at the specified placing position.

Other features and effects of this invention will be easily understood and appreciated from the detailed description of the embodiments of this invention stated in conjunction with the accompanying draiwngs.

BRIEF DESCRIPTION OF THE DRAWINGS

FIG. 9A to 9C are operation explanatory diagrams of a further different modified example of lock mechanism;

FIG. 10A is a sectional view XA—XA of FIG. 9A;

FIG. 10B is a sectional view XB—XB of FIG. 9B;

DESCRIPTION OF THE PREFERRED EMBODIMENTS

Figure 1:
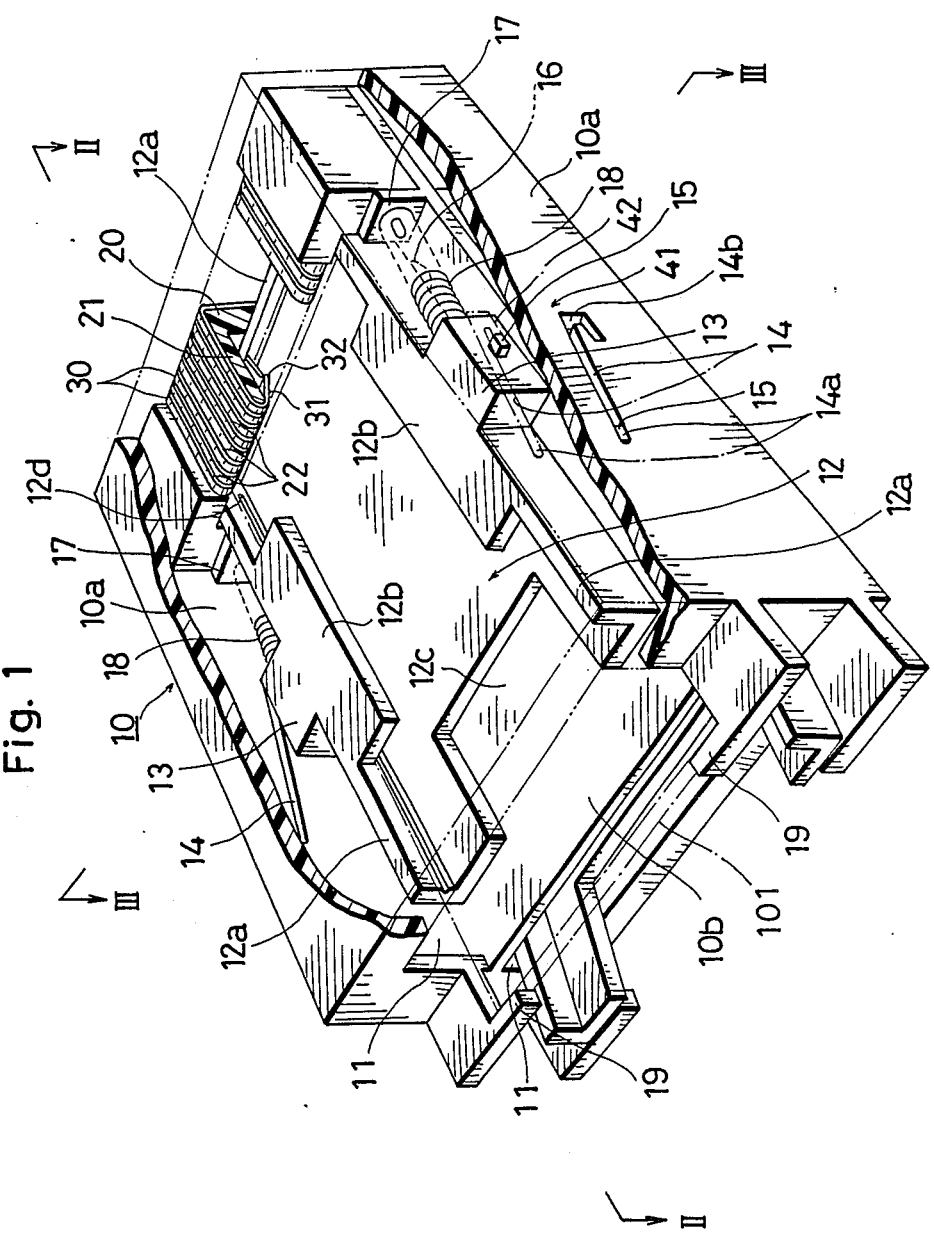
FIG. 1 is a partially cut-away perspective view showing the internal structure of one of the embodiments of the electrical connector of this invention.
Figure 2:
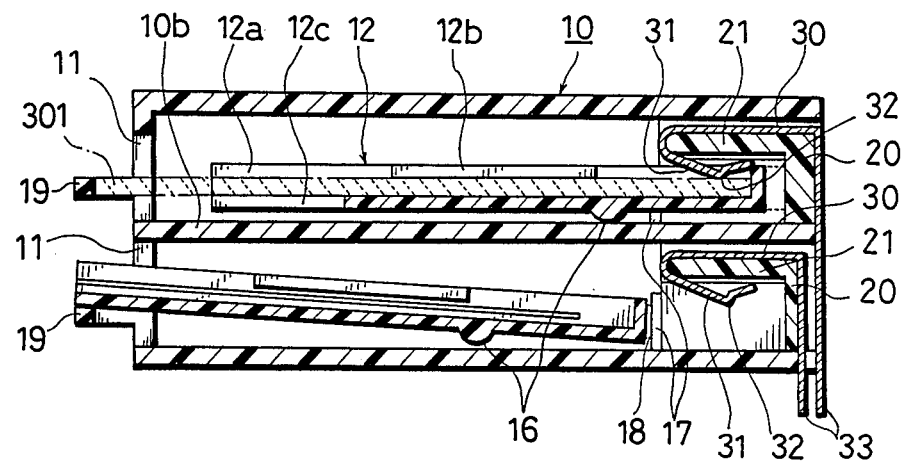
FIG. 2 is a sectional view II—II of the electrical connector in FIG. 1.
Figure 3:
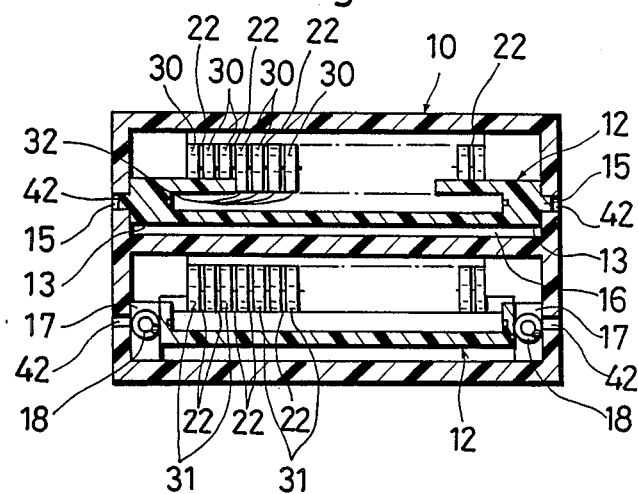
FIG. 3 is a sectional view III—III of the electrical connector in FIG. 1.

Referring first to FIG. 1 to FIG. 3, numeral 10 is a housing of this electrical connector, and this housing 10 is made of synthetic resin, and upper and lower two card inlets 11, 11 are opened in the front face. The shown electrical connector is intended to insert and remove an IC card from these card inlets 11, 11, and nearly identical mechanisms corresponding to the card inlets 11, 11 are composed in upper and lower two stages in the housing 10. Therefore, in the following explanation, mainly the upper mechanism is referred to, and detailed descriptions of the lower stage are omitted.

Figure 4:
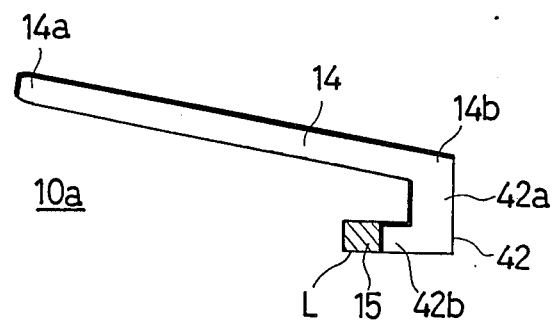
FIG. 4 is a magnified explanatory view of gudie hole and key hole of the electrical connector in FIG. 1.

Numeral 12 is a tray used as slider. This tray 12 has an upright peripheral wall 12a on the peripheral edge except for the front side. At both sides of this tray 12, guide parts 13, 13 are projected at symmetrical positions right and left of the middle part in the longitudinal direction, and guide protuberances 15, 15 to be inserted into guide holes 14, 14 projected on the side walls 10a, 10a of said housing 10 are disposed on these guide parts 13, 13. Namely, the guide holes 14, 14 serve as the guide paths for guiding the movement of said tray 12. These guide protuberances may be shaped in circular cylinder, but it is preferable to form in rectangular column as shown in order to fix the tray 12 in a specified inclination angle. At the back side of the bottom plate of said tray 12, an oscillating fulcrum 16 in a semicircular sectional shape is disposed at the specified position in the longitudinal direction, and this oscillating fulcrum 16 is designed to abut against the vertical partition wall 10b formed integrally on the housing 10 when said guide protuberance 15 reaches the final end 14b (see FIG. 4) of the guide groove 14. The tray 12 also has card holding pieces 12b, 12b, which face to each other at an interval of card thickness against the bottom of middle part in the longitudinal direction in order to correctly set the IC card on this tray 12, formed integrally with the peripheral wall 12a. Furthermore, in the bottom of the tray 12, a notch 12c is formed in part of the frond end so that the IC card may be easily inserted into or removed from the connector.

Said guide holes 14, 14 are disposed being inclined in the descending direction toward the deeper side from the inlet 11 with respect to the vertical partition wall 10b of the housing 10. The terminal end 14b of this guide hole 14 is disposed at the position where said rotary fulcrum part 16 abuts against the vertical partition wall 10b when the guide protuberance 15 is located at this terminal end 14b as mentioned above. The starting end 14a of this guide hole 14 is disposed at the position where the front end side of the tray 12 having the guide protuberance 15 can be projected outside of the card inlet 11 when the guide protuberance 15 moves to the starting end 14a (see FIG. 4) of this guide hole 14.

On said vertical partition wall 10b, spring receptacles 17, 17 are erected at the position opposite to the rear end of the guides 13, 13 formed on said tray 12. Between these spring receptacles 17, 17 and guides 13, 13, compression springs 18, 18 are stretched as the thrusting means for thrusting the tray 12 toward the card inlet 11 side. Therefore, unless an external force is applied to said tray 12, said guide protuberance 15 is guided to the starting end 14a of the guide hole 14 by the thrusting force of these compression springs 18, 18.

Numeral 20 is a holder integrally formed in the rear end part of the housing for assembling a conductor piece 30 which is described below. This holder 20 has a contact piece support part 21 for supporting the contact piece part 31 of the conductor piece 30. This contact piece support part 21 is projected upward behind the tray 12 20 which is pushed in until the guide protuberance 15 reaches the terminal end 14b of the guide groove 14. On said holder 20, plural partition walls are formed at equal intervals in its widthwise direction in order to assemble the conductor pieces 30 . . . without making contact with each other.

The conductor piece 30 is made of a slender spring plate, and the front end side is shaped in an L-form so as to enclose the contact piece support part 21 of the holder 20, thereby stretching the V-shaped contact piece part 21 downward of the contact piece support part 20. The top of this V-shaped contact piece part 31 is used as a contact 32. The base end part 33 of each conductor piece 30 projects downward of the housing 1 as shown in FIG. 2.

A lock mechanism 41 is composed of an L-shaped key hole 42 consecutively disposed of the terminal end 14b of said guide hole 14, and said guide protuberance 15 and compression spring 18. That is, by pushing the tray 12 by resisting the thrusting force of the compression spring 18, when the guide protuberance 15 reaches the terminal end 14b of the guide hole 14, said oscillating fulcrum part 16 abuts against the vertical partition wall 10b as mentioned above. At this point, therefore, when the front end side of the tray 12 is moved downward, the tray 12 oscillates around the oscillating fulcrum part 16, and said guide protuberance 15 reaches the lower end along the vertical hole 42a of the key hole 42 (see FIG. 4). Then, at this position, when pushign is released, the guide protuberance 15 receives the thrusting force of the compression spring 18, and gets into the lateral hole 42b of the key groove 42 (see FIG. 4), so as to be fixed at the terminal end of this lateral hole 42b, that is, at the locking position L (see FIG. 4). Thus, when the guide protuberance 15 is fixed at the locking position L, the tray 12 is set on the specified placing plane. The rear part of the tray 12 from the oscillating fulcrum part 16 moves upward, so that the contact 32 of the conductor pieces 30 . . . elastically abuts against plural contacts 102 provided in an IC card 101 as shown in FIG. 11 which is held by the tray 12.

Figure 11:
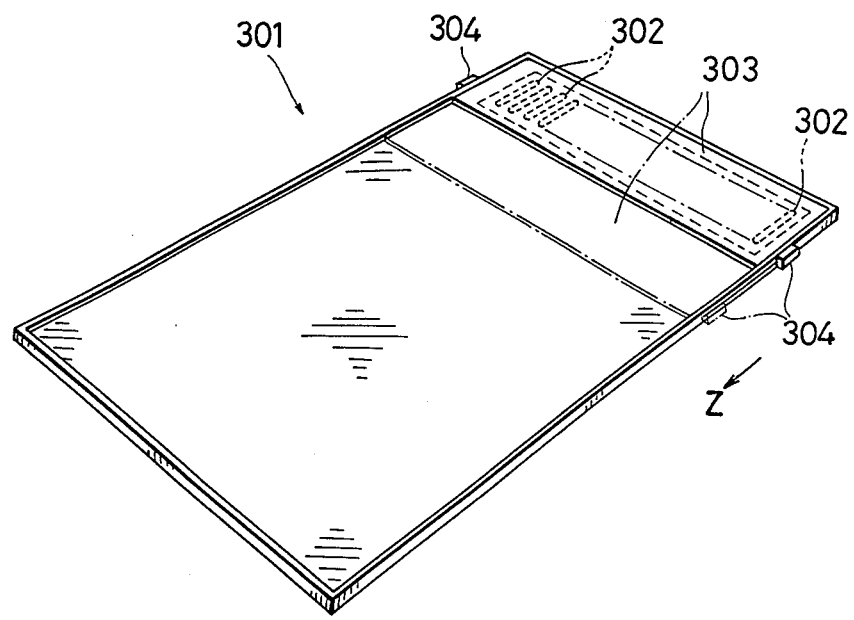
FIG. 11 is a perspective view of IC card.
Figure 12:
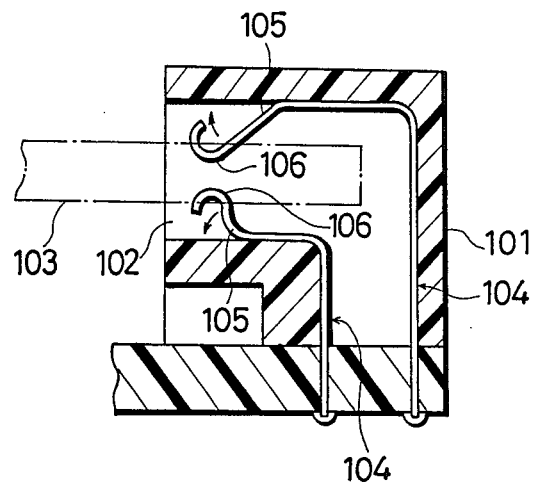
FIG. 12 is a sectional view of a conventional example.
Figure 13:
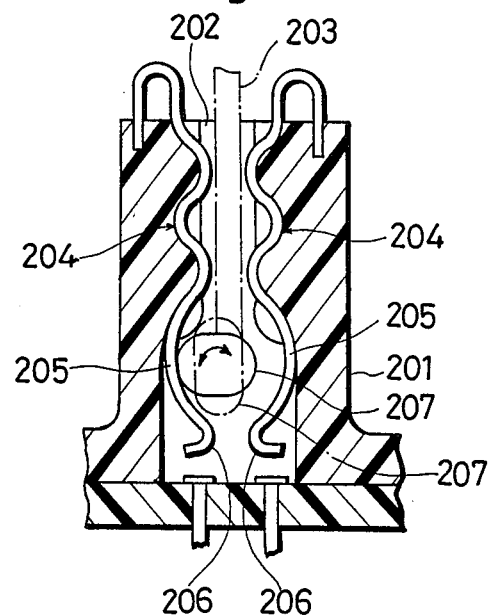
FIG. 13 is a sectional view of another conventional example.

The IC card 301 shown in FIG. 11 is further described below. This IC card 301 is used, for example, as an external memory for personal computer, and plural contacts 302 . . . are disposed at the rear end side to conduct with the main printed wiring board at the equipment main body side. These contacts 302 . . . are usually covered with a shutter 303 provided for the purpose of ESD measure. This shutter 303 is designed to be opened as indicated by a single dot chain line by moving the knob 304 thrust by a spring (not shown) disposed on the side face in the direction of arrow Z by resisting this thrusting force, so that said contact 301 is exposed.

As clear from the structure of the IC card 301 shown above, the interval of said conductor pieces 30 . . . , that is, contacts 32, is set in the same interval as the contacts 302 . . . of the IC card 301. Besides, on the inner circumference of the peripheral walls at both sides of the tray 12, an engaging part 12d is provided. This engaging part 12d is to be engaged with said knob 304 so as to expose the contacts 302 . . . of the IC card by opening the shutter 303 when the rear end of the IC card 301 abuts against the peripheral wall 12a at the rear end side of the tray 12. Furthermore, in the housing 10, stoppers 19, 19 to abut against the IC card front end side are formed so that the IC card 301 may not be dislocated from the tray 12 by the reaction of the thrusting force given to the shutter 303 when the tray 12 is fixed at the specified placing plane by said lock mechanism 41.

The procedure of use and operation of thus composed electrical connector are explained by reference to FIG. 5A to FIG. 5E, in which, however, the compression spring 18 is omitted.

Figure 5A:
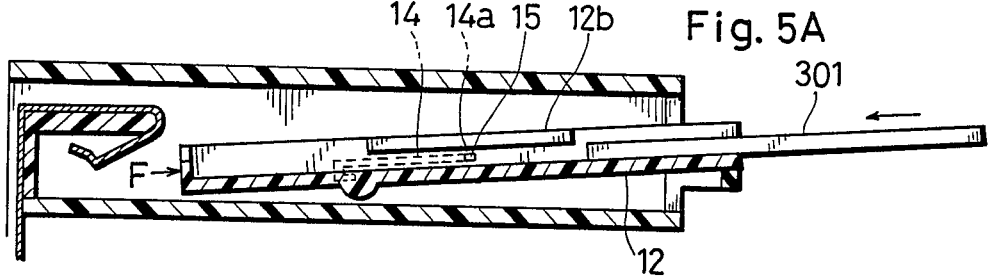
FIG. 5A to FIG. 5E are operation explanatory diagrams of the electrical connector in FIG. 1.

In FIG. 5A, the tray 12 is subjected to the thrusting force F of the compression spring 18, and the guide protuberance 15 is positioned at the starting end 14a of the guide hole 14, and the front end part projects from the card inlet 11. On this tray 12, the front part of the IC card 301 as mentioned above is placed.

Figure 5B:
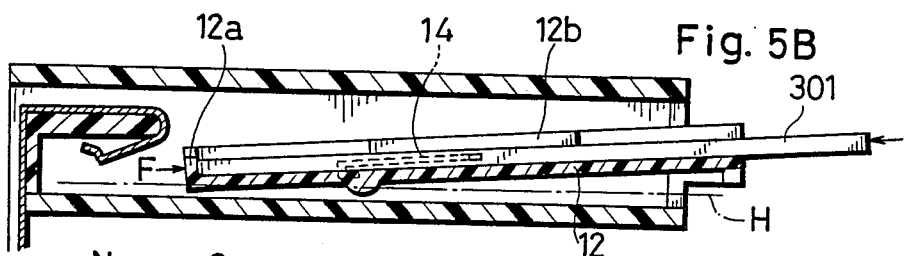

The IC card 301 is pushed in, through the clearance between the bottom of the tray 12 and the card holder 12b, until abutting against the rear end side peripheral wall 12a of the tray 12 as shown in FIG. 5B. At this time, the knob 304 of the IC card 301 is engaged with the engaging portion 12b formed in the tray 12, and the shutter 303 is opened, so that the contacts 302 . . . of the IC card 301 are exposed.

Figure 5C:
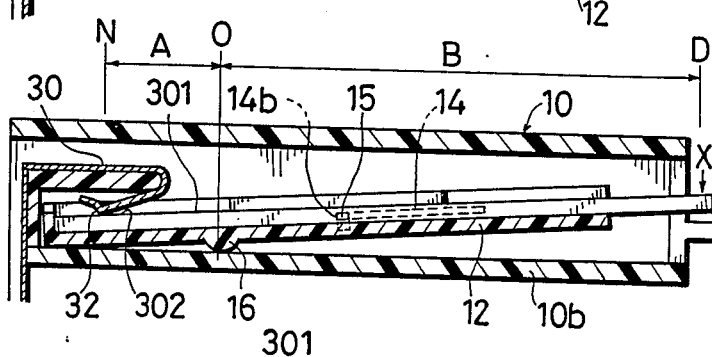

When the IC card 301 is further pushed in after the rear end of the IC card 301 abuts against the rear end side peripheral wall 12a of the tray 12, the tray 12 slides toward the rear side of the housing 10 along the guide hole 14 while resisting the thrusting force F of the compressoin spring 18. That is, as the tray 12 runs along the guide hole 14, it slides in a state being inclined with respect to the specified placing plane H indicated by a virtual line (a single dot chain line), and moves until the guide protuberance 15 reaches the terminal end 14b of the guide hole 14 as shown in FIG. 5C. At this time, the oscillating fulcrum part 16 formed on the back side of the bottom plate of the tray 12 abuts against the vertical partition wall 10b of the housing 10. Meanwhile, the contact 32 of the conductor piece 30 is disposed so as not to touch the IC card 301 held on the tray 12 when the tray 12 slides, which is made possible by sliding the tray 12 as being inclined to the placing plane H as mentioned above.

Figure 5D:
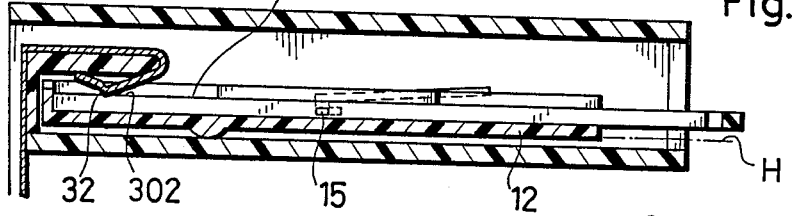

Next, the front end of the IC card 301 is pushed downward (in the direction of arrow X in FIG. 5C) while keeping the pressure to the rear end side of the housing 10, and the tray 12 engaged with this IC card 301 is rotated about the oscillating fulcrum part 16, so that the tray 12 is placed on the specified placing plane H as shown in FIG. 5D. At this time, the guide protuberance 15 moves to the lower end along the vertical slot 42a in the key hole 42. Incidentally, when pushing down the front end of the tray 12, the contact 32 elastically abuts against the contacts 302 . . . of the IC card 301 at the opposite side of the oscillating fulcrum part 16. Accordingly, said pressure part is subjected to the reaction to resist the pushing force due to the spring action of the contact piece part 31 forming the contact 32. Therefore, as shown in FIG. 5C, the forming position 0 of said oscillating fulcrum part 16 must be arranged so that the pressure at the depression position D may not be neither excessive nor unsifficient by properly setting the distance A from the contacting position N of the contact 32 and contact 302, and the distance B from the depression position D of the tray 12. For example, if the contact pressure between the contact 32 of one conductor piece 30 and the contact 302 is 100 g, the total contact pressure reaches 5 kg if there are 50 contact pieces 30. In this case, hence, by setting the ratio A:B to 1:10, it is desired to keep the pressure at the depression position D at about 500 g.

Figure 5E:
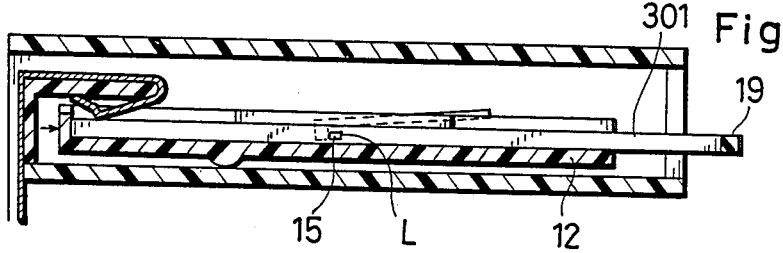

When the pressure to the rear end side of the housing 10 is released when the tray 12 is thus positioned on the placing plane H, as shown in FIG. 5E, the tray 12 slides by the thrusting force F of the compression spring 18 until the guide protuberance 15 gets into the lateral slot 42b of the key hole 42 and is held in the lock position L. At the same time, the front end face of the IC card 301 abuts against the stopper 19. Therefore, by the reaction of the thrusting force in the closing direction applied to the shutter 303 as mentioned above, the IC card 301 will not be dislocated from the tray 12.

In this way, the tray 12 is set in the specified placing plane H, and the contact 32 elastically touches the contact 302 of the IC card 301, so that the IC card 301 is electrically connected with the external equipment main body.

To remove the IC card 301 from the connector, the operation is as follows. First, the IC card 301 is pushed in, resisting the thrusting force F of the compression spring 18, and the guide protuberance 15 is moved from the lock position L to the lower end part of the vertical slot 42a of the key hole 42. As a result, by the force of the contact 32 pressing the contact 302 of the IC card 301, the tray 12 oscillates about the oscillating fulcrum part 16, and the guide protuberance 15 moves to the terminal end 14b of the guide hole 14. Thus, when the guide protuberance 15 is positioned at the terminal end 14b of the guide hole 14, the tray 12 slides, due to the thrusting force of the compression spring 18, in a state being inclined to the placing plane H, toward the card inlet 11 side, and the front end part is projected from the card inlet 11. Besides, by the reaction of the thrusting force applied to the shutter 303, the IC card 301 moves the tray 12 slightly to the front end side of this tray 12, so that the IC card 301 may be easily taken out by pinching its end part.

In thus composed electrical connector, when inserting or removing the IC card 301 into or out of the housing 10, the contact 302 of the IC card 301 and the contact 32 of the connector do not rub against each other, so that deterioration of quality of connector due to abrasion of the contacts 32, 302 may be avoided. In addition, it is possible to lock by setting at a specified placing plane H only by pushing in and pushing down the IC card 301 held on the tray 12 i to the housing 10, and operation is extremely simple.

The electrical connector of this invention is, of course, not limited to the above embodiment. For example, the lock mechanism may be modified in various structures as described below.

Figure 6:
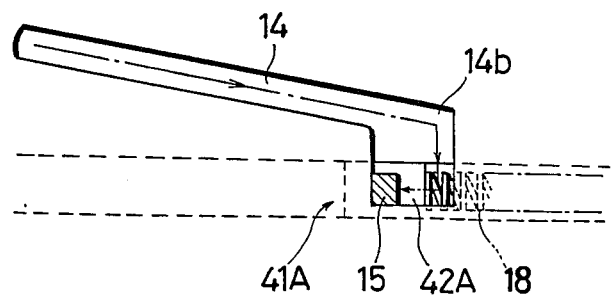
FIG. 6 is an explanatory drawing showing a modified example of lock mechanism.

FIG. 6 shows a lock mechanism 41A approximately similar in structure to the lock mechanism 41 shown in the embodiment mentioned in FIG. 1 to FIG. 5, and in this lock mechanism 41A, the key hole 42A disposed at the terminal end 14b of the guide hole 14 is not L-shaped as in the key hole 42 in the above embodiment, but is shaped in a rectangular form possessing a stroke capable of moving the guide protuberance 15 in the thrusting direction of the compression spring 18. In such composition, therefore, it is required that the pressing force of pressing the guide protuberance 15 against the front side of the key hole 42A by the thrusting force of the compression spring 18 be greater than the force of lifting up the guide protuberance 15 created by the elastic touching of the contact 32 with the contact 302.

Figure 8:
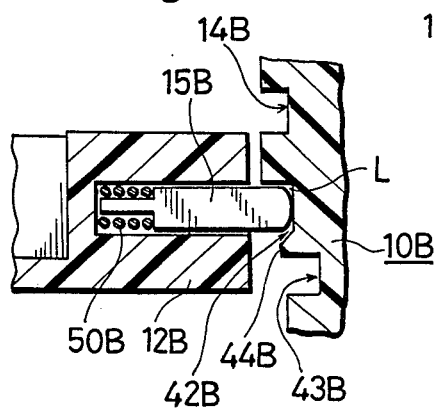
FIG. 8 is a sectional view VIII—VIII of FIG. 7.
Figure 7:
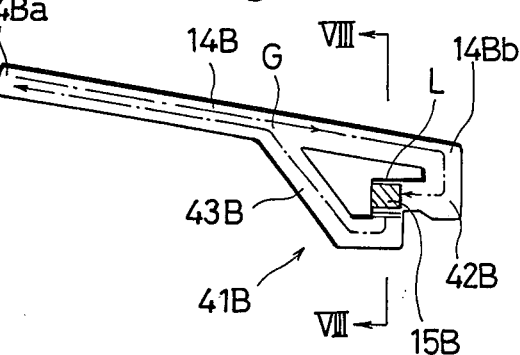
FIG. 7 is an explanatory drawing showing another modified example of lock mechanism.

FIG. 7 and FIG. 8 show a further different lock mechanism 41B suited to an electrical connector nearly in the same composition as in the embodiment shown in FIG. 1 to FIG. 3.

The guide hole 14 and key holes 42, 42A in the above embodiment may be directly replaced by the guide groove or key groove opened in the inner side of the housing side wall, but the key groove 42B, feedback groove 43B and guide groove 14B communicating therewith in the lock mechanism 41B shown here are also opened in the inner side of the side wall of the housing 10B.

In this lock mechanism 41B, as shown in FIG. 8, the guide protuberance 15B has a variable projection thrust outward of the tray 12B by the compression spring 50B contained in the tray 12B, and its end peripheral part is shaped in a round form. Besides, as shown in FIG. 7, there is a feedback groove 43B for feeding back the guide protrusion 15B to the front side from the terminal end 14Bb of the guide groove 14B, being disposed consecutively from the lock position L of the L-shaped key groove 42B consecutively disposed at the terminal end 14Bb of the guide groove 14B. Between this feedback groove 43B and the lock position L of said key groove 42B, as shown in FIG. 8, a protrusion 44B for stopping the guide protuberance 15B is set up, and this protrusion 44B is formed on a slope of a smooth rising surface of the lock position L side, and its height is set to such an extent that the guide protuberance 15B can ride over by retreating to the inside of the tray 12B by pressing the compression spring 50B. The feedback groove 43B is formed so as to feed back the guide protuberance 15B to the guide groove 14B by the thrusting means (the compression spring 18 in FIG. 1) for thrusting the tray 12B to the card inlet side. That is, the feedback groove 43B is formed deeper than the lock position L and guide groove 14B in the lower portion of the lock position L of the key groove 42B, and becomes shallower as going toward the converging point G with the guide groove 14B, finally becoming equal to the depth of the guide groove 14B at the converging point G.

In thus composed lock mechanism 41B, same as in FIG. 5A to FIG. 5E, when releasing after setting the tray 12B at specified placing plane H, it is enough only to push down the tray 12B further. That is, when the tray 12B is thus pushed down, the guide protuberance 15B presses down the compression spring 50B, and rides on the protrusion 44B while retreating into the tray 12B, and then fits into the feedback groove 43B. In this way, when the guide protuberance 15B fits into the feedback groove 43B, the tray 12B is thrust by the thrusting means such as compression spring 18 in the above embodiment, and the guide protuberance 15B is moved to the converging point G with the guide groove 14B. The guide protuberance 15B getting into the guide groove 14B moves toward the front end side of the guide groove 14B by said thrusting means. Thus, in the lock mechanism 41B shown here, the IC card can be taken out only by further pushing down the IC card on the placing plane, and it is not necessary to unlock by pushing the slider (tray 12) engaged with the IC card against the thrusting means. Therefore, great force is not needed in releasing, and unlocking is extremely easy. However, in the case of the lock mechanism 41B shown here, when the guide protuberance 15B is fitted in the feedback groove 43B, the tray 12B is moving to the front side in the state being on the placing plate H, which makes it impossible to form a stopper 19 as provided in the housing 10 of the electrical connector shown in the embodiment in FIG. 1 to FIG. 5E. Therefore, when using such lock mechanism 41B, it may be applied only to an IC card not having shutter 103, or an IC card, if having shutter 103, possessing a mechanism of self-holding the shutter in the open position. Besides, for use in the IC card with self-holding mechanism, it is necessary to add the mechanism to release this self-holding to the electrial connector side.

FIG. 9A to FIG. 10B explain a still another lock mechanism 41D. This lock mechanism 41D has a lock member 44D which can be elastically deformed in the direction departing from the side of the slider 12D and can move by resisting the thrusting force to the rear end side (direction of arrow Y) of the slider 12D, and this lock member 44D has an engaging piece 45D forming a stepped part 45Da. In this lock mechanism 41D, by further pushing down (in the direction of arrow U in FIG. 10A) the slider 12D pushed to a specified position, said lock member 44D is pushed and extended in the direction of arrow S shown in FIG. 10A by the engaging protuberance 50D formed on the side face of the slider 12D, and the engaging protuberance 50D is engaged with the lower end of the engaging piece 45D of the lock member 44D as shown in FIG. 9B and FIG. 10B. When unlocking, by moving the lock member 44D against the thrusting force as shown in FIG. 9C, the engagement between the engaging protuberance 50D and engaging piece 45D is canceled.

In this way, various modifications of the lock mechanism may be considered, and in this invention, other constituent elements may be also modified in various versions. For example, the slider may be a tray as shown in the embodiment, or may be formed only of a frame, and in short it is enough when the held card can be moved securely without dropping it out. The thrusting means is not limited to compression spring, but the slider may be thrust by a tension spring, or even if the same compression spring as in the embodiment is used, the compressoin spring may be stretched between the rear end of the tray 12 and the housing 10, and the setting position of the compression spring may be varied differently. Furthermore, as the oscillating fulcrum part, for instance, a shaft diferent from the guide protuberance 15 in the above embodiment may be disposed on the side face of the slider, and this shaft may be moved to the specified fulcrum position by sliding same as said guide protuberance 15 so as to oscillate the shaft around this fulcrum position. The design can be thus changed variously. Still more, the structure for locating the contacts at specified positions may be also modified in various designs. Needless to say, the electrical connector of this invention can be applied to other cards than the IC card possessing contacts.

What is claimed is:

1. An electrical connector comprising:
   an inlet opened in a housing for inserting and removing a card having contacts;
   a slider which is engaged with the card inserted in this inlet and moves in a state inclined with respect to a specified placing plane by pushing the engaged card;
   thrusting means for thrusting this slider to said inlet side;
   an oscillating fulcrum part for oscillating the slider moved to the inner side of said inlet so as to position on said specified placing plane;
   a lock mechanism for fixing the slider positioned on said specified placing plane on this placing plane; and
   contacts formed in a contact piece part of a conductor piece having a spring action, and disposed at a position of elastically touching the contacts of the card engaged with the slider when said slider is positioned on said placing plane.

2. The electrical connector of claim 1, wherein guide paths inclined toward said placing plane are disposed at both sides of the slider, guide protuberances to be inserted into said guide paths are formed on said slider, a key unit is consecutively formed next to the terminal end of the guide paths to allow to insert the guide protuberances, whereby said slider can be moved with respect to the placing plane as said guide protuberances move along the guide paths, and the lock mechanism fixes the slider on the placing plane by holding said guide protuberances at the lock position of said key unit by the thrusting means.

3. The electrical connector of claim 2, wherein the key unit is shaped in an L-form bent toward the starting end side of said guide paths, and has a lock position to be engaged with said gudie protuberance at the terminal end thereof.

4. The electrical connector of claim 2, wherein the key unit is shaped in a rectangular form, and said guide protuberances are held in the lock position by pressing the guide protuberances against the peripheral wall at the lock position of this key unit by the thrusting means.

5. The electrical connector of claim 3, wherein the guide paths and key unit are guide holes and key hole pierced in the side wall of the housing.

6. The electrical connector of claim 4, wherein the guide paths and key unit are guide holes and key hole pierced in the side wall of the housing.

7. The electrical connector of claim 3, wherein the guide paths and key unit are guide grooves and key groove provided in the side wall of the housing.

8. The electrical connector of claim 7 comprising a feedback groove which is disposed consecutively to the termindl end of said key groove by way of a convex part and is converged with said guide groove adhead of the terminal end of this key groove, and having said guide protuberances as protrusions with various projections thrust to the projection side, wherein fixing of the slider by said lock mechanism is released by inserting the guide protuberances into said feedback groove through said convex part and bringing them up to the starting end part of the guide groove through the feedback groove by said thrusting means.

9. The electrical connector of claim 1, wherein the lock mechanism possesses an engaging protuberance formed on the side face of the slider, and an engaging piece to be engaged with said engaging protuberance when said slider is positioned on the placing plane, being able to elastically deform in the direction of departing from the side face of the slider by means of said engaging protuberance.

10. The electrical connector of claim 5, wherein the contacts are formed in the top of the contact piece part bent in a V-form.

11. The electrical connector of claim 7, wherein the contacts are formed in the top of the contact piece part bent in a V-form.

12. The electrical connector of claim 8, wherein the contacts are formed in the top of the contact piece part bent in a V-form.

13. The electrical connector of claim 9, wherein the contacts are formed in the top of the contact piece part bent in a V-form.

14. The electrical connector of claim 10, wherein the slider is a tray having the peripheral wall to abut against the card inserted from said inlet formed at the rear end side, the thrusting means is a compression spring stretched between the spring receptacble which is integral with said housing and said tray, and an oscillating fulcrum part of a semicircular section abutting against the integral part with the housing when the guide protuberance reaches the terminal end of said guide path is projected at the back side of the bottom of said tray.

15. The electrical connector of claim 11, wherein the slider is a tray having the peripheral wall to abut against the card inserted from said inlet formed at the rear end side, the thrusting means is a compression spring stretched between the spring receptacble which is integral with said housing and said tray, and an oscillating fulcrum part of a semicircular section abutting against the integral part with the housing when the guide protuberance reaches the terminal end of said guide path is projected at the back side of the bottom of said tray.

16. The electrical connector of claim 12, wherein the slider is a tray having the peripheral wall to abut against the card inserted from said inlet formed at the rear end side, the thrusting means is a compression spring stretched between the spring receptable which is integral with said housing and said tray, and an oscillating fulcrum part of a semicircular section abutting against the integral part with the housing when the guide protuberance reaches the terminal end of said guide path is projected at the back side of the bottom of said tray.

17. The electrical connector of claim 13, wherein the slider is a tray having the peripheral wall to abut against the card inserted from said inlet formed at the rear end side, the thrusting means is a compression spring stretched between the spring receptable which is integral with said housing and said tray, and an oscillating fulcrum part of a semicircular section abutting against the integral part with the housing when the guide protuberance reaches the terminal end of said guide path is projected at the back side of the bottom of said tray.

* * * * *

UNITED STATES PATENT AND TRADEMARK OFFICE
CERTIFICATE OF CORRECTION

PATENT NO. : 4,810,203
DATED : March 7, 1989
INVENTOR(S) : Yasuhiro Komatsu

It is certified that error appears in the above-identified patent and that said Letters Patent is hereby corrected as shown below:

Claim 3, column 10, line 50, "gudie" should be --guide--.

Claim 8, column 11, line 1, "adhead" should be --ahead--.

Claim 15, column 12, line 9, "receptacble" should be --receptacle--.

Signed and Sealed this

Twenty-fourth Day of October, 1989

*Attest:*

DONALD J. QUIGG

*Attesting Officer*   *Commissioner of Patents and Trademarks*